(12) United States Patent
Lamy et al.

(10) Patent No.: US 6,245,121 B1
(45) Date of Patent: Jun. 12, 2001

(54) METHOD FOR TREATING AQUEOUS LIQUID EFFLUENTS CONTAINING ORGANIC AND INORGANIC MATERIALS TO ENABLE RECYCLING THEREOF

(75) Inventors: Pierre-Yves Lamy, Saint-Clair du Rhone; Jean-Pierre Communal, Le Peage de Roussillon, both of (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/117,391

(22) PCT Filed: Jan. 28, 1997

(86) PCT No.: PCT/FR97/00166

§ 371 Date: Sep. 15, 1998

§ 102(e) Date: Sep. 15, 1998

(87) PCT Pub. No.: WO97/28101

PCT Pub. Date: Aug. 7, 1997

(30) Foreign Application Priority Data

Jan. 29, 1996 (FR) .................................... 96 01002

(51) Int. Cl.[7] .............................. C05F 3/00; C05F 7/00; C05F 11/00

(52) U.S. Cl. .................................. 71/1; 71/6; 71/8; 71/9; 71/11; 71/15; 71/20; 71/21; 210/600; 210/601; 210/620; 210/749; 210/767

(58) Field of Search ................................ 71/9, 11, 15, 1, 71/6, 8, 21, 20; 210/620, 749, 769, 900, 600, 767, 768, 799, 601, 631; 426/7, 55

(56) References Cited

U.S. PATENT DOCUMENTS

| | | | | |
|---|---|---|---|---|
| 3,963,637 | * | 6/1976 | Chappell | 252/181 |
| 4,863,608 | * | 9/1989 | Kawai et al. | 210/638 |
| 5,292,441 | * | 3/1994 | Chen et al. | 210/735 |
| 5,560,832 | * | 10/1996 | Sivakumar et al. | 210/708 |
| 5,679,261 | * | 10/1997 | Sivakumar et al. | 210/727 |
| 5,788,838 | * | 8/1998 | Yamasaki et al. | 210/150 |

FOREIGN PATENT DOCUMENTS

| | | | |
|---|---|---|---|
| 0 315 713 | 5/1989 | (EP) . | |
| 0 396 390 | 11/1990 | (EP) . | |
| 0 426 219 | 5/1991 | (EP) . | |
| 0 490 859 | 6/1992 | (EP) . | |
| 2729381 | * 1/1995 | (FR) | 210/708 |
| 59-92098 | 5/1984 | (JP) . | |
| 62-244494 | 10/1987 | (JP) . | |
| 63-229198 | 9/1988 | (JP) . | |
| 4-227899 | 8/1992 | (JP) . | |
| 95 21140 | 8/1995 | (WO) . | |

OTHER PUBLICATIONS

Metcalf & Eddy, Inc., Wastewater Engineering Treatment, Disposal and Reuse, 3rd Edition, p64,301–314,756–759, 768–773,842–843, 1991.*

* cited by examiner

*Primary Examiner*—Steven P. Griffin
*Assistant Examiner*—Eileen E. Nave
(74) *Attorney, Agent, or Firm*—Burns, Doane, Swecker & Mathis, L.L.P.

(57) ABSTRACT

Provided is a process for the treatment of aqueous effluents containing organic and inorganic matter and having a solids content of at most 12% by weight to provide a purified liquid phase and a solid organic fertilizer or organic soil improver. The process includes subjecting the effluent to one or more primary liquid/solid separation steps to obtain a liquid medium containing no more than 3% by weight of dry matter and having a turbidity of at most 300 NTU and a collection of concentrates containing in total 15% by weight dry matter. The liquid medium is subjected to ultra filtration or micro filtration to obtain an ultra filtrate or a micro filtrate containing at most 1% by weight dry matter and having a turbidity of at most 100 NTU. The ultra filtrate or micro filtrate is subjected to a reverse osmosis operation to obtain a concentrate and a permeate. The permeate constitutes a purified aqueous phase.

20 Claims, 3 Drawing Sheets

METHOD FOR TREATING AQUEOUS LIQUID EFFLUENTS CONTAINING ORGANIC AND INORGANIC MATERIALS TO ENABLE RECYCLING THEREOF

BACKGROUND OF THE INVENTION

1. Field of the Invention

The present invention relates to a process for the treatment of aqueous liquid effluents containing organic and inorganic matter for the purpose of their beneficiation. It relates more specifically to a process for the treatment of aqueous liquid effluents containing organic and inorganic matter so as to obtain, on the one hand, a purified aqueous liquid phase and, on the other hand, a solid organic agricultural fertilizer and/or soil improver.

It also relates to the application of the said process to the treatment of liquid animal excreta and in particular of animal manure, especially pig manure.

It also relates to the application of this process to the treatment of other effluents, such as the effluents coming from agri-foodstuffs industries.

In general, the present invention relates to a process for the treatment of an aqueous liquid effluent containing organic and inorganic matter having a content of from 1 to 12% by weight of dry matter.

2. Description of the Related Art

Considerable production of aqueous effluents of agricultural origin, especially of animal manure, poses problems of increasing seriousness to agriculture and also to protection of the environment, especially of water courses and groundwater tables. Increasingly stringent regulations are being put into place so as to avoid the very negative effects of pollution of the environment due to various types of animal manure.

The pollution caused affects the entire environment: air, water, soil (ground water). More specifically, the pollution is manifested by:

unpleasant smells (volatile organic matter, $H_2S$, $NH_3$);

discharge of nitrates (into surface water and ground water);

discharge of phosphates (essentially into surface water by entrainment during run-off); and the bacteriological aspect (when spreading or transporting manure).

At the present time, the known processes for purifying such effluents have the drawback of not always treating the problem in its entirety. For example, the biological processes of the nitrification/denitrification type produce a biological sludge containing most of the phosphates, it being possible for this sludge to be used in a correct agronomic manner only in spreading over surfaces equivalent to that of a raw manure. The same applies to the processes of extraction and thermal dehydration of volatile organic matter and of ammoniacal nitrogen compounds. Systems combining the biological processes of anaerobic digestion and of thermal dehydration using the biogas give rise to complex units operating on a very large scale. They then require a collective treatment centre and take up a lot of room on the roads. Moreover, they are a factor in contagion from one stock farm to another, requiring strict sanitary operations to be carried out on the transportation means.

The purpose of the present invention is to solve the abovementioned drawbacks. To this end, the present invention aims to provide a process for the treatment of aqueous effluents containing organic and inorganic matter, which allows all these effluents to be utilized on the very sites of their production or in their vicinity without any appreciable pollution transfer.

SUMMARY OF THE INVENTION

Thus, the subject of the invention is a process 30 for the treatment of an aqueous liquid effluent containing organic and inorganic matter and especially manure, this effluent having a solids content of at most 12% by weight of dry matter, so as to obtain, on the one hand, a purified liquid phase and, on the other hand, a solid organic fertilizer and/or organic soil improver, which process comprises:

subjecting the effluent to one or more primary liquid/solid separation steps and, optionally, one or more physicochemical treatment steps, thereby obtaining, on the one hand, a liquid medium containing no more than 3% and preferably no more than 1% and especially no more than 0.7% by weight of dry matter and having a turbidity of at most 300 NTU, preferably at most 200 NTU and in particular at most 120 NTU and, on the other hand, a collection of concentrates containing in total at least 15% and preferably at least 20% by weight of dry matter;

subjecting the liquid medium thus obtained to an ultrafiltration or microfiltration step, thereby obtaining an ultrafiltrate or microfiltrate containing at most 1% by weight of dry matter and having a turbidity of at most 100 NTU and preferably at most 50 NTU;

subjecting the ultrafiltrate or microfiltrate to a reverse osmosis operation, thereby obtaining a concentrate and a permeate, this permeate constituting the purified aqueous phase;

optionally, adding and mixing with the collection of concentrates an organic complement in particulate form so as to obtain a mixture containing from 20 to 40% by weight of dry matter, and aerobically fermenting (or composting) the said mixture until an organic soil improver and/or organic fertilizer having a dry matter content of 40 to 60% by weight is/are obtained.

DETAILED DESCRIPTION OF THE PREFERRED EMBODIMENTS OF THE INVENTION

Figure 1:
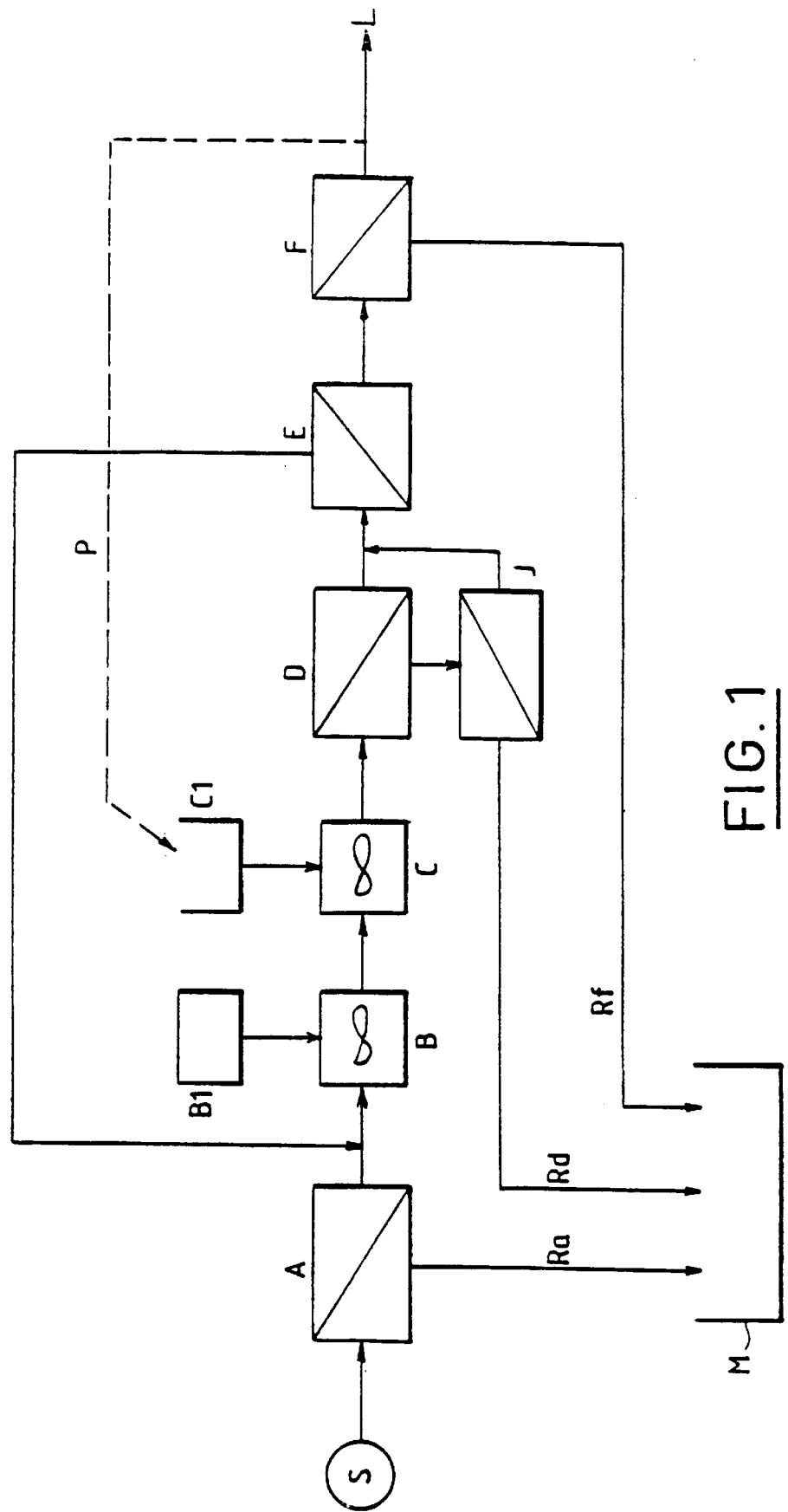
FIG. 1 is a diagram of the first part of a process according to the invention.

Purified aqueous phase should be understood to mean an aqueous phase whose nitrogen and phosphorus contents are substantially reduced with respect to those of the initial effluent. Thus, if the organic and inorganic matter, especially manure, contained in this effluent comprises 2 to 6 kg of nitrogen per $m^3$ and 3 to 6 kg of $P_2O_5$ per $m^3$, the purified aqueous phase obtained advantageously contains less than 20%, and particularly less than 15%, by weight of the nitrogen of the manure and less than 5%, and particularly less than 1%, by weight of the phosphorus of the said manure.

It should be noted that the amounts of dry matter indicated correspond to the amounts of dry matter after oven drying for 24 hours, i.e. they correspond to the amounts of dry matter of the products from which the matter volatilized at 105° C. for 24 hours has been removed.

According to the invention, the primary liquid/solid separation step(s) may comprise at least one filtration step whose purpose is to lower the dry matter content in the medium to a level at most equal to 3% by weight and advantageously at most equal to 1% by weight, optionally after a subsequent treatment by physico-chemical processes, so as thereafter to be able to treat the medium thus obtained by ultrafiltration or microfiltration.

This primary liquid/solid separation step may be carried out by means of a mechanical filtration, the lower cut-off threshold of which is generally between 0.025 and 1 mm and preferably between 50 and 250 micrometers. Its purpose is to lower the suspended matter content of the effluent substantially. The means used for this purpose will preferably give a first high-solids-content concentrate. This may be obtained using equipment known to those skilled in the art. In particular, a press screw, a centrifuge or, preferably, a rotary drum filter with continuous extraction of the concentrate. It is possible, beforehand, also to carry out a coarse/solid separation step or screening if the effluent to be treated contains relatively large solid particles which would handicap the liquid/solid fine filtration equipment.

The process according to the invention advantageously comprises a physico-chemical coagulation treatment, and/or flocculation, in general after the previous step of coarse liquid/solid separation, and/or just before a filtration step.

Thus, the effluent from the coarse liquid/solid separation step may be treated by means of at least one coagulant. Any type of coagulant may be employed.

Thus, it is possible to use at least one inorganic coagulant. Preferably, the inorganic coagulant is then an iron salt or aluminium salt. This iron salt may satisfy the following formula (1):

$$Fe_2Cl_x(SO_4)_y \quad (1)$$

in which $0 \leq x \leq 6$, $0 \leq y \leq 3$ and $x+2y=6$.

Likewise, the aluminium salt may satisfy the following formula (2):

$$Al_2(OH)_aCl_b(SO_4)_c \quad (2)$$

in which $0 \leq a \leq 6$, $0 \leq b \leq 6$, $0 \leq c \leq 3$ and $a+b+2c=6$.

The inorganic coagulant may especially be chosen from the group formed by ferrous chloride, ferric chloride, ferrous sulphate, ferric sulphate, ferric chlorosulphate, aluminium sulphates and basic aluminium chlorosulphates. A mixture of inorganic coagulants may be employed. The amount of inorganic coagulant employed is generally between 0.1 and 50 kg per $m^3$ of effluent and preferably between 1 and 15 $kg/m^3$ of effluent.

At least one organic coagulant may also be employed. This organic coagulant usually consists of a neutral or, very preferably, a cationic polyelectrolyte.

The polyelectrolytes capable of being thus employed are, for example:

neutral polyamines and quaternized polyamines; more specifically, neutral or quaternized polyalkylamines and polyhydroxyalkylamines may be mentioned; particularly suitable are the following homopolymers: polyethyleneamine, poly(2-hydroxy-1-propyl-N-methylammonium chloride), poly(2-hydroxy-1,1-propyl-N-dimethylammonium chloride), poly(2-vinylimidazolinium hydrogen sulphate), poly(diallyldimethylammonium chloride); mention may also be made of the copolymer formed by acrylamide and diallyldimethylammonium chloride;

polyaminoacrylates and polyaminomethacrylates, and more specifically poly(dialkylamino)alkyl acrylates and poly(dialkylamino)alkyl methacrylates; by way of example, neutral or quaternary poly-N,N-(dimethylamino)ethyl methacrylate is very suitable, whether in the form of the homopolymer or of a copolymer with acrylamide;

polyaminoacrylamides and polyaminomethacrylamides, and more specifically poly(dialkylamino)alkylacrylamides or poly(dialkylamino)alkylmethacrylamides; by way of example, mention may be made of poly-N-(dimethylamino-propyl) methacrylamide polymers and poly-N-(dimethylamino)ethylacrylamide polymers.

A mixture of organic coagulants may also be used. The amount of organic coagulant which can be employed is generally between 0.1 and 5 $kg/m^3$ of effluent.

Preferably, at least one inorganic coagulant and at least one organic coagulant are employed.

The coagulant or the mixture of coagulants may be used in the presence of at least one acid in such a way that it operates at the optimum pH value of the reaction mixture. The Applicant has found that adding acid makes it possible, especially in the case of animal manure, to reduce the amount of coagulant(s) substantially.

In particular in the case of animal manure, the acid is preferably sulphuric acid, this having two advantages:

that of modifying the equilibrium of the ammonium salts towards ammonium sulphate which is chemically and thermally more stable than ammonium carbonate (or ammonium bicarbonate);

the sulphate component is agronomically utilized in the solid final product obtained from the various concentrates produced by the treatment of the liquid effluent.

Very advantageously, a mixture formed from at least one inorganic coagulant, at least one organic coagulant (preferably a cationic polyelectrolyte) and at least one acid (preferably sulphuric acid) and, optionally, water is employed.

The coagulation step is preferably carried out with stirring.

The coagulation step constitutes a step in which the effluent to be treated is conditioned. The Applicant has also found that this step resulted in the precipitation of phosphate-based compounds and those based on phosphorus and generally of proteinic compounds, and also resulted in a decrease in the BOD (biological oxygen demand) and in the COD (chemical oxygen demand).

After the coagulation step, the process of the invention may advantageously comprise a flocculation step, preferably using at least one anionic polyelectrolyte.

Preferably (but not limitingly), the anionic-type polyelectrolyte which can be employed is an anionic polyacrylamide, a polyacrylate, a polymethacrylate, a polycarboxylate, a polysaccharide (for example, xanthan gum, guar gum or alginate) or chitosan.

A mixture of anionic-type polyelectrolytes may be employed.

The amount of polyelectrolytes employed in this step is generally between 1 and 100 grammes, preferably between 2 and 30 grammes, expressed in weight of dry polyelectrolyte, per $m^3$ of organic waste (present in the initial mixture to be treated).

The effluent from the flocculation step is generally subjected to a liquid/solid separation operation (in particular, filtration) which removes the flocculated suspended matter.

The ultrafiltration or microfiltration operation used in the present invention is a known technique which forms part of the membrane-type separating techniques, the transfer driving force of which is a pressure gradient.

Here, it is carried out by means of any suitable ultrafiltration or microfiltration device.

The ultrafiltration or microfiltration used in the present invention may be transverse or, preferably, tangential. In the latter case, the operating principle consists generally in making the effluent flow under pressure along a membrane which is permeable to the solvent but impermeable to the solutes that it is desired to retain.

The membrane employed for carrying out the ultrafiltration operation in the process according to the invention may be organic or inorganic.

It may be homogeneous, asymmetric or composite. A membrane is called asymmetric when the permselective layer represents only a very small thickness of the membrane; in contrast, a homogeneous membrane constitutes the permselective layer in its entirety; one particular case of an asymmetric membrane is the composite membrane obtained by depositing the permselective layer on a pre-existing support.

The configuration of the membrane employed is, for example, multi-channelled tubular, spiralled or planar.

Its cut-off threshold is generally between 0.001 and 0.5 $\mu$m.

Within the context of the invention, it is possible to use, as membrane, in particular an inorganic membrane made of zirconia deposited on an alumina, stainless steel or carbon support (for example, having a 0.14 $\mu$m cut-off threshold).

It is also possible to employ an organic membrane based on polysulphone or polyvinylidene fluoride or preferably based on acrylonitrile copolymers (for example, having a 40 kD cut-off threshold).

An inorganic membrane on a monolithic support may also be used, such as the membrane described in European Patent Application EP-A-0,585,152.

As a result of the ultrafiltration or microfiltration operation, a retentate (or concentrate) and an ultrafiltrate or microfiltrate (or permeate) are obtained.

The retentate (or concentrate) obtained after the ultrafiltration or microfiltration step may be recycled into the liquid/solid separation step or steps.

The production of a mixture containing preferably no more than 1% by weight of dry matter and having a turbidity of preferably at most 200 NTU, prior to the ultrafiltration or microfiltration step, has the major advantage of operating this step at a high volume concentration factor, i.e. at a high incoming effluent/concentrate ratio (by volume). Thus, the flowrate of retentate (or concentrate) coming from the ultrafiltration or microfiltration step, which is advantageously recycled into the liquid/solid separation step or steps, is small compared with the flowrate of incoming effluent. It is found that in pork manure effluent the flowrate of recycled concentrate may represent ⅕ of the incoming flowrate since the ultrafiltration or microfiltration step is fed with at most 1% by weight of dry matter and with a turbidity of at most 200 NTU.

Next, the effluent from the ultrafiltration or microfiltration step is subjected to a reverse osmosis operation.

A second retentate (or concentrate) and a second filtrate (or permeate) are then obtained.

The reverse osmosis operation is a technique well known to those skilled in the art and forms part of the membrane-type separating techniques whose transfer driving force is a pressure gradient.

The reverse osmosis employed in the present invention is preferably tangential. The operating principle consists in making the effluent to be treated flow at a pressure greater than its osmotic pressure along a membrane which is permeable to water but impermeable to the solutes, dissolved organic matter and to the salts.

The efficiency of the separation may therefore be adjusted by the choice of membranes, of pressures and of the pH so as to produce a final permeate of quality suitable for its post-treatment use.

The configuration of the membrane may be tubular, discoid (in the form of a disc) planar or, preferably, spiralled.

The membrane employed for carrying out the reverse osmosis operation in the process according to the invention is preferably organic and may be supported by an organic or inorganic material. Generally, it is of the cellulose acetate type and is preferably a polysulphone-polyamide blend.

The filtrate from the reverse osmosis step is a colourless and odourless liquid, in which the BOD/COD content of pathogenic elements and of dissolved salts, in particular, ammonium and potassium salts and phosphates, makes it possible especially to discharge it into the natural environment, such as streams or irrigation channels, depending on the locally applicable standards or constraints.

The retentate (concentrate) from the reverse osmosis step contains the light fractions of the organic matter dissolved in the treated effluent and the dissolved salts.

The concentrates from the physico-chemical liquid/solid separation steps and from the reverse osmosis step may be combined for the purpose of converting them into an organic soil improver and/or organic fertilizer by aerobic fermentation (or composting).

In general, the process according to the invention does not include a treatment step using an oxidizing agent before the ultrafiltration or microfiltration step, as described in FR 94/01093.

However, it may include such a step, especially just before the ultrafiltration or microfiltration step.

The oxidizing agent used is then generally chosen from the group formed by oxygen, oxygenated derivatives, especially peroxides (for example hydrogen peroxide or ozone), chlorine, chlorinated derivatives (for example, chlorine dioxide, sodium hypochlorite, calcium hypochlorite, potassium hypochlorite, sodium chlorite, sodium chlorate or eau de Javelle) and potassium permanganate.

A mixture of oxidizing agents may be employed.

Advantageously, eau de Javelle will be used as the oxidizing agent; the amount of eau de Javelle employed is then generally between 0.1 and 5 liters, preferably between 0.5 and 1 liter, per $m^3$ of organic waste (present in the initial medium to be treated).

According to a preferred embodiment, the process of the invention comprises, in succession, the following steps:

(A) subjecting the aqueous liquid effluent containing organic and inorganic matter to at least one primary liquid/solid separation step, thereby obtaining a first concentrate and a filtrate;

(B) treating the filtrate from step (A) using at least one coagulant, optionally in the presence of at least one acid;

(C) treating the effluent obtained from step (B) using at least one flocculant, preferably at least one anionic polyelectrolyte;

(D) subjecting the effluent obtained from step (C) to at least one primary liquid/solid separation step, thereby obtaining a second concentrate and a filtrate;

(E) subjecting the filtrate obtained from step (D) to a membrane ultrafiltration or microfiltration operation, thereby obtaining a retentate and a filtrate, the retentate preferably being recycled into step (B) (upstream of the latter);

(F) subjecting- the filtrate from step (E) to a reverse osmosis operation so as to obtain a permeate, which constitutes the purified aqueous phase, and a concentrate (retentate);

(G) mixing the concentrate from step (A) with the concentrate from step (D) and the concentrate from step (F);

(H) optionally adding an organic complement in 30 particulate form to the mixture from step (G) so as to obtain a mixture containing from 20 to 40% by weight of dry matter; and (I) aerobically fermenting (or composting) the mixture from step (G) or (H) until an organic soil improver and/or organic fertilizer having a dry matter content of 40 to 60% by weight is/are obtained.

In this preferred embodiment, the liquid/solid separation means of the first step (A) advantageously comprise a centrifuge, a settling tank, a press screw or alternatively, and preferably, a rotary drum filter with continuous extraction of the cake. In the case of the press screw or rotary drum filter, the mesh screens will have a pass size of between 25 $\mu$m and 1 mm, preferably between 50 and 200 $\mu$m.

The liquid/solid separation means of step (D), after coagulation/flocculation, advantageously comprise a drum filter, a draining belt with or without pressing rolls, a settling tank if the density of the floc particles produced justifies it, or else a flotation apparatus if the density of the floc particles justifies it, a centrifuge or a filter press.

Preferably, a combination of two of these means is used in step (D). The first liquid/solid separation in step (D) provides a concentrate having a medium solids content (i.e. containing at least 4% by weight of dry matter); the second liquid/solid separation in step (D) treats this concentrate so as to obtain a concentrate having a high solids content (i.e. containing at least 15% and preferably at least 20% by weight of dry matter). A medium-solids-content concentrate is advantageously conditioned before it is treated in the second liquid/solid separation step, preferably by chemical conditioning.

Such chemical conditioning using at least one inorganic coagulant, preferably of formula 1 or 2 defined above, rather than a cationic polyelectrolyte, has the advantage of an additional supply of sulphate. It also makes it possible to limit the addition of water to the system that the high doses of organic substance as a 0.5% to 1% solution would necessarily entail. Moreover, the inorganic coagulant makes it possible to limit the COD of the filtered water. Conditioning using an inorganic coagulant of the iron or aluminium salt type is a major advantage compared with calcium, which is often used in town sludge. This is because it limits the ability of the effluent to clog up the membranes. It is thus possible to obtain turbidities at most equal to 200 NTU, similar to those obtained in the first coagulation step. Chemical conditioning using an inorganic coagulant of the aforementioned series, combined with dehydration on a roller table or filter press, may allow a dryness corresponding to more than 25% by weight of dry matter to be achieved.

The filtrate obtained from step (D) contains at most 3%, preferably at most 1% and especially at most 0.7% by weight of dry matter and has a turbidity of at most 300 NTU, preferably at most 200 NTU and in particular at most 120 NTU.

The collected mass formed by the concentrate Ra of step (A), the concentrate Rd of step (D) and the concentrate (retentate) Rf of step (F) contain the very large majority of the organic and inorganic materials suspended and dissolved in the treated effluent, including the N, P, Mg, Fe, Cu and Zn compounds of animal manure.

According to the invention, the collection of solid residues Ra, Rd and Rf is used for producing an organic agricultural soil improver and/or fertilizer by composting (or biological stabilization). This composting consists of an aerobic fermentation of the rapidly fermentable organic matter.

This aerobic fermentation generally takes place as follows.

The collected mass of animal excreta is naturally seeded with aerobic fermentation micro-organisms which, under suitable humidity and temperature conditions, rapidly develop. In a low-temperature first phase, the mesophyllic micro-organisms are predominantly active compared with the thermophilic micro-organisms. As the activity increases, the temperature within the material increases and, in a second phase, the thermophilic activity becomes predominant and may reach a temperature (55/65° C.), within the core of the volume of material, which is the optimum fermentation temperature. This temperature is self-regulated. The activity of the aerobic micro-organisms requires an influx of oxygen either by natural aeration or by aeration activated by sucking air out or blowing air in through the material. The heat balance of this activity is positive; the balance helps to dry the material by evaporation during the treatment. The management of this process therefore relies on controlling the moisture content and the aeration of the biomass. In practice, the conversion of the entire material may be achieved by turning it over and mixing it as soon as the core temperature reaches the 55/65° C. level.

In general, aerobic fermentation is initiated when the material has a moisture content of between 60 and 80% (i.e. a 20 to 40% by weight of dry matter).

The concentrates obtained using the process of the present invention advantageously have the following solids contents by weight:

Ra>25%

Rd>15%

Rf>2%.

The conditions for starting aerobic fermentation are obtained, if necessary, by supplementation with organic matter having a high solids content, i.e. greater than that of the mixture of residues.

For this supplementation it is preferred to use an agricultural or silvicultural coproduct such as chopped straw, bark (ground or unground), sawdust or even a fossil organic material such as peat. This material has a particle size and a composition which ensure that the moisture in the mixture is properly homogenized, by absorbing the water of the concentrate, and that, the material being disposed in the form of a pile, there is sufficient aeration to ensure that the biomass is supplied with oxygen.

In the case of a raw manure having from 1.5 to 5% by weight of dry matter, the Applicant has found that the mixture of these three concentrates has a solids content of at least 15% and especially at least 20% by weight.

The supplementation, for example using 15% by weight of wood sawdust containing 90% dry matter and sieved to 3 mm gives a mixture which flows well and has an aerated structure, this being desired for the aerobic fermentation step; the mixture might then contain approximately 30% by weight of dry matter.

In general, the homogeneous stabilization of the entire biomass is firstly obtained by turning and mixing it two or three times with an interval or intervals of approximately one to two weeks when the easily fermentable matter is consumed, and secondly by maturation following the fermentation, which takes place more slowly and requires the mixture to be turned over a further once or twice. Suitable stabilization may be achieved by natural aeration over a total period of 4 to 16 weeks depending on the supplementation material used. The soil improver obtained is then stored and is ready to be used, with or without prior conditioning, using conventional means.

Figure 2:
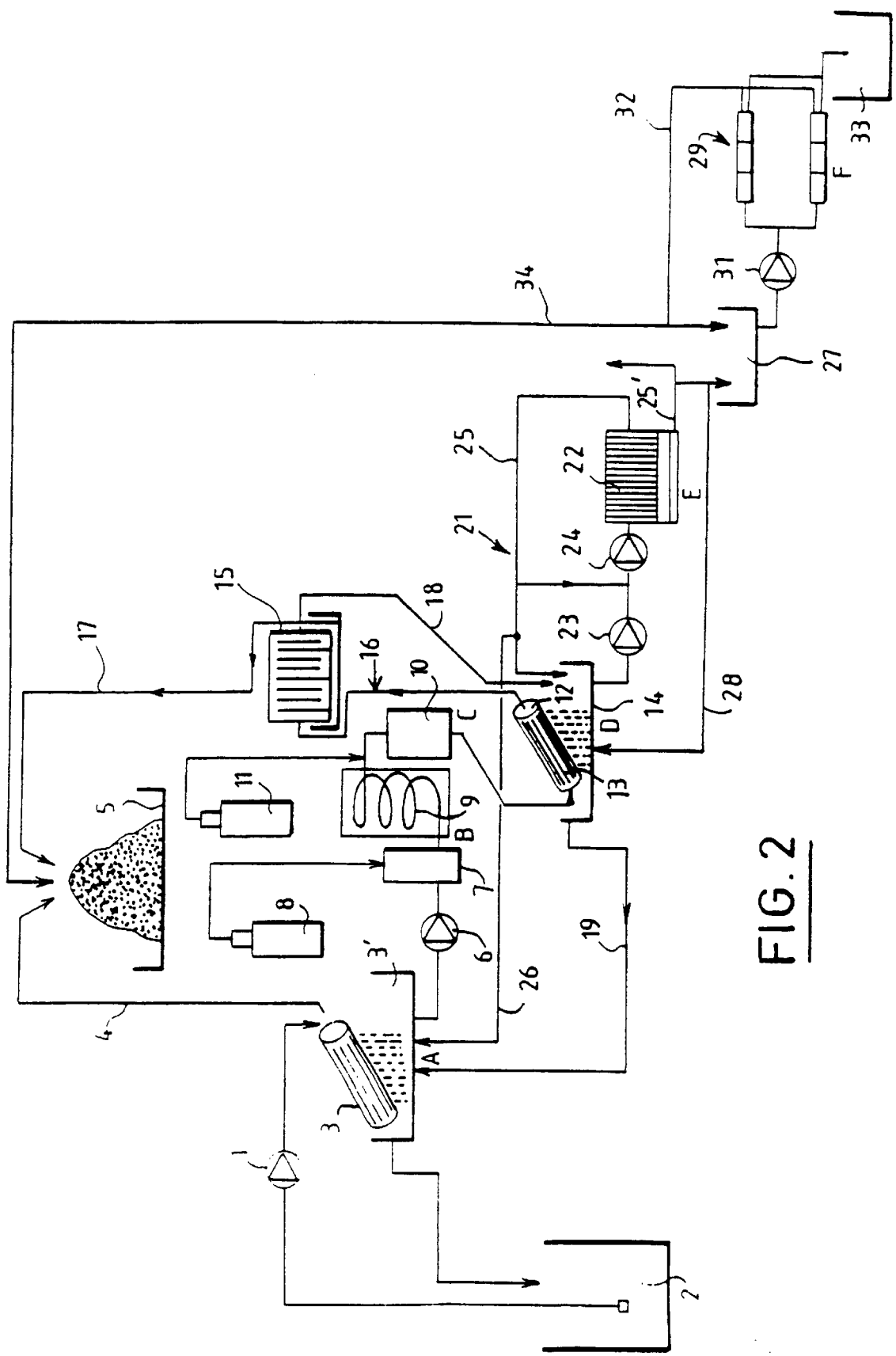
FIG. 2 is a diagram of one embodiment of a part of a plant for implementing the treatment process according to the invention.
Figure 3:
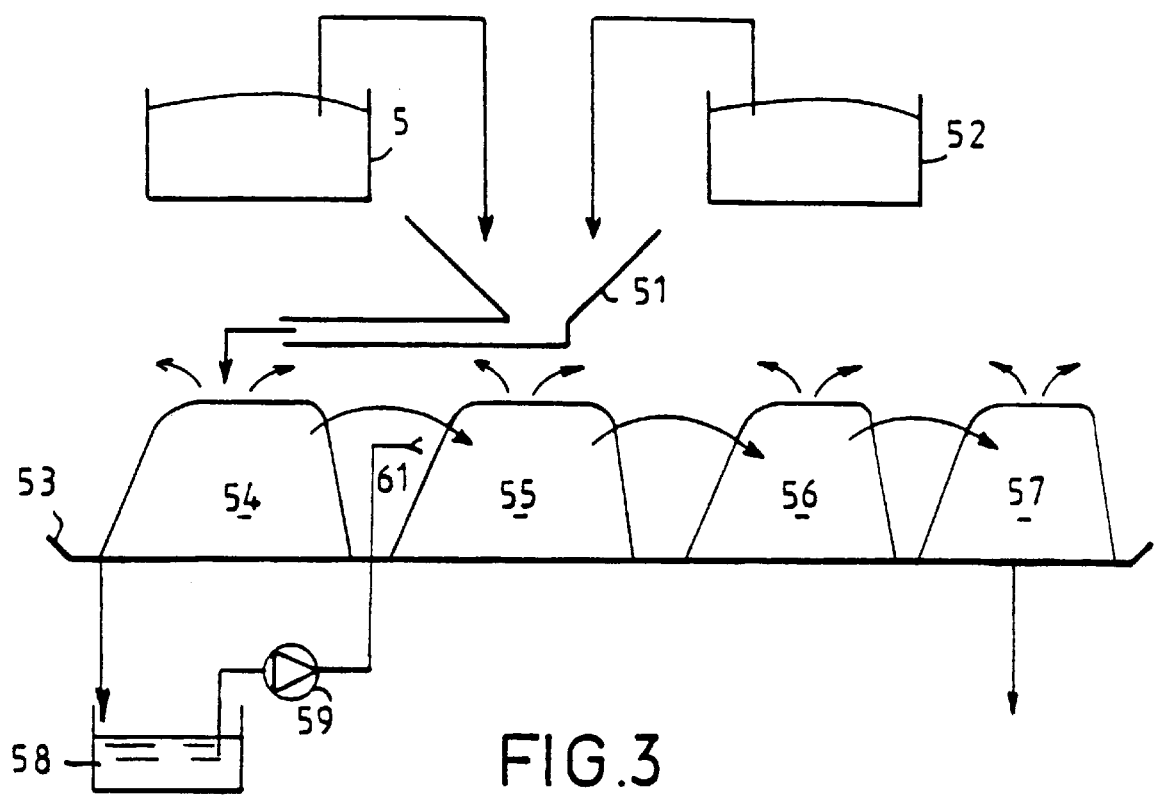
FIG. 3 is a diagram of an embodiment of a second part of a plant for implementing the treatment process according to the invention.

The process according to the invention will be more clearly understood by means of the following detailed description, which refers to the appended figures, in which:

FIG. 1 shows a general diagram of the first part of the process according to the invention;

FIG. 2 shows the general diagram of one embodiment of part of a plant for implementing the treatment process according to the invention; and FIG. 3 shows the general diagram of an embodiment of a second part of a plant for implementing the treatment process according to the invention.

As shown in FIG. 1, the aqueous liquid effluent containing organic and inorganic matter, such as a manure, coming from a storage tank S, is firstly subjected to a step A of primary liquid/solid separation which provides, on the one hand, a filtrate and, on the other hand, a concentrate Ra.

The concentrate Ra is sent to a zone M for mixing solid materials, while the filtrate is sent to a coagulation zone B into which a solution of one or more coagulants coming from a tank B1 is introduced, this solution being optionally mixed with an acid.

The effluent from zone B is then treated in a zone C with a flocculant solution coming from a tank C1. This solution may be premixed with a part P of the purified liquid effluent L.

The effluent from zone C is sent to a filtration zone D which provides, on the one hand, a filtrate which is sent to an ultrafiltration or microfiltration zone E and, on the other hand, a concentrate which is sent to a dehydration zone J in order to provide a dehydrated concentrated Rd which is sent to the mixing zone M, while the liquid effluent from the dehydration zone is returned to zone E.

The ultrafiltration or microfiltration in zone E provides a filtrate which is sent to a reverse osmosis treatment zone F while the retentate of zone E is recycled upstream of zone B.

Zone F provides, on the one hand, a permeate which constitutes a purified effluent, a part P of which may be recycled, as mentioned previously, while the concentrate Rf is sent to the mixing zone M.

A plant for implementing the process will now be described in greater detail.

As shown in FIG. 2, the mixture to be purified is pumped by a pump 1 from the pit 2 to a rotary drum filter 3.

This rotary drum filter has a casing composed of a succession of stainless steel lamellae of triangular cross-section, the top of which is directed towards the outside. Between them, they leave a passage space of between 50 and 150 μm. Inside the drum, an extraction system allows continuous extraction of the concentrate, which is subjected by the rotation to powerful draining caused by an acceleration of approximately 25 g (250 m/s$^2$).

The rotary drum filter may also be replaced by a pressing screw with a pass mesh of between 50 and 200 μm. Preferably, the drum filter chosen is one which provides a better solids content of the concentrate, containing from 25 to 35% dry matter, and a 30 to 60% capture of suspended matter in the incoming manure.

The liquid/solid separation step (A) is carried out continuously. The treatment capacity of step (A) is adjusted by the capacity of the subsequent steps. The adjustment is firstly made by regulating the output of the pump 1 and then, if necessary, using the storage capacity of the tank 3' provided with a level indicator which, if required, momentarily stops step (A) (the pump 1 and the system for driving the drum filter) and with a safety overflow connected to the pit 2.

If need be, the pit 2 may be provided with a system for periodically mixing the effluent so as to homogenize it.

The solids separated in step (A) are conveyed by an automatic device consisting of a belt 4 to a storage device 5 or they fall under gravity onto the storage area 5, depending on the arrangement of the equipment. If draining occurs, the liquids are returned to step (A).

Next, the effluent obtained from step (A) is pumped by the pump 6 to a coagulator 7.

The coagulant is injected into the coagulator 7 from a storage tank 8, which coagulant may or may not have been acidified using sulphuric acid.

The coagulator 7 generally consists of a reactor which provides intimate mixing between the effluent and the coagulant. The said reactor may therefore be fitted with axial blades which provide a peripheral rotational velocity of between 0.5 and 7 m/s, advantageously between 0.8 and 5 m/s or may consist of a static mixer; the coagulator 7 may be extended by a coiled tube 9 giving a contact time between the mixture and the coagulant of between 10 seconds and 15 minutes, advantageously between 30 seconds and 2 minutes.

After step (B), the mixture to be treated is conveyed to the flocculation step (C).

The apparatus 10 used for the flocculation is identical to the coagulator 7 of step (B) except that, when movable elements are used for the mixture, the rotational velocity of the blades is lower and lies within the range of 0.4 to 3 m/s, advantageously from 0.7 to 1.5 m/s.

The flocculant is injected from a storage tank 11 upstream of the flocculator 10.

If movable elements are employed for the mixture, the shafts of the coagulator 7 and of the flocculator 10 may advantageously be driven by the same motor.

The effluent obtained from step (C) undergoes a liquid/solid separation operation in step (D).

The liquid/solid separation device 12 used for this purpose consists of a rotary drum filter (having a filter support 13), of a settling tank if the relative density of the floc particles justifies it (>1) or a flotation apparatus or hydrocyclone if the relative density is <1. In the case of an animal manure, the device is advantageously chosen from devices such as a flotation apparatus or hydrocyclone. The filtrate is recovered in a tank 14.

With a static flotation apparatus, the concentrate reaches a dryness corresponding to at least 4% and generally at least 6% of dry matter and the filtrate preferably has a solids content of more than 1% by weight.

The concentrate (or sludge) is conveyed by a belt or chute or by pumping to the dehydrator 15 after having optionally been conditioned, preferably using an inorganic coagulant 16. The dehydration device used for this purpose generally consists of a centrifuge or a pressing belt or a filter press or a draining belt with rollers.

Tests have been carried out which demonstrate that there is a significant increase in dehydration by chemical conditioning using coagulation compared with the dehydration obtained without such conditioning.

The amount of inorganic coagulant used for the chemical conditioning depends on the solids content of the concentrate. Thus, the higher the solids content of the concentrate the larger the amount of coagulant. For example, for dry matter contents of 10% by weight, it is advantageous to use 45 kg of a commercial solution of a coagulant of the iron salt or aluminium salt type per tonne of concentrate to be conditioned and for dry matter contents of 6.6% by weight it is advantageous to use 30 kg of a commercial solution of a coagulant of the iron salt or aluminium salt type per tonne of concentrate to be conditioned.

These tests prove that there is a reduction in the filtration dehydration resistance provided by the chemical conditioning. Such values obtained on a capillary filterability test [CST(1)] make it possible, according to the state of the art of filter presses, to result in a solids content of the filter cake using a filter press of at least 25% by weight.

The concentrate from the dehydrator is sent by a chute or belt 17 or by gravity to the area 5 where it joins the concentrate from step A.

The liquid effluent from the dehydrator 15 is returned via a pipe 18 to the tank 14, which has an overflow 19 returning to the tank 3'. The effluent from the tank 14 is conveyed to step (E) where it is subjected to ultrafiltration.

Preferably, the ultrafiltration is tangential and carried out in a manner known per se in an ultrafiltration device 21 which comprises an ultrafiltration module 22, equipped with an organic membrane made of acrylonitrile copolymers having a cut-off threshold of 40 kD, and, in a known manner, a feed pump 23 and a recirculating pump 24 together with a recirculation loop 25.

The retentate obtained from step (E) is recycled via a pipe 26 into the tank 3'.

The effluent from the ultrafiltration step (E) may be used in agriculture or discharged into a sewage system or collected in a tank 27 from which it is taken to step (F) where it is subjected to reverse osmosis.

If need be, until the ultrafiltration module 21 reaches an optimum operating level, the effluent (permeate) 25' is recycled into the tank 14 via a pipe 28.

The reverse osmosis device 29 used according to the invention has, in a known manner, a reverse osmosis membrane of known type, of spiralled shape and made of a polysulphone-polyamide blend, deposited on an organic support, as well as a feed pump 31 and a recirculation loop 32.

The reverse osmosis is preferably of the tangential type. The permeate obtained from this step is stored in a tank 33 and its use depends on the operating conditions and on the local constraints. Having no pathogens and being colourless and odourless, it may be used as water for technical purposes. In the operation of a piggery, it may be partly recycled, by washing sties and pits covered by grating floors pits and partly used in irrigation and/or, if the local conditions so allow, discharged to the environment.

The retentate 34 obtained during this reverse osmosis operation may be conveyed to the storage area 5 or to a separate storage tank.

The process according to the invention is a process which, from step (A) to step (F), may be carried out continuously.

It may be used directly on the effluent-producing site and be adapted to all types of output without requiring collection beforehand.

As a variant, the reverse osmosis may be carried out in a batch process using two tanks such as 27 which are fed in succession.

The conversion of the concentrates coming from the concentration separation steps (A) to (F) and stored in the storage area 5 is illustrated in FIG. 3.

Unlike the first phase, this phase is not continuous.

All the concentrates from steps (A), (D) and (F) are collected in the storage area 5. This collection is conveyed to a mixer 51. At the same time, supplementary materials, consisting of an organic supplement in particulate form (such as wood sawdust, ground bark, chopped straw or peat), stored in an area 52, are sent to the mixer 51. The mixer, the dryness of which was adjusted by controlling the amount of organic supplement added, is set out in an area 53 in the form of a windrow 54.

In order to aid the comprehension, a windrow treatment technique is described here. In this case, the material physically advances in the conversion area. Of course, a treatment may be employed in which the material remains in one place throughout the conversion, with turning-over/mixing cycles as indicated below in the case of windrows.

The core temperature of the windrow must preferably reach 55/65° C. It is mixed by turning it over in order to constitute the windrow 55, the previous windrow having been turned over in order to constitute the windrow 56. Likewise, the windrow previously at the place where the windrow 56 was is turned over, in the form of the windrow 57, in order to complete its maturation.

The draining liquor (if there is any) and the rainwater run-off in the area 53 (if it is uncovered) are collected in a pit 58. When the latter is full, a pump 59 empties it and pours the liquor over the windrows 55,56 by means of a spray system 61.

After stabilization, the collection of concentrates and organic supplement is converted into an organic soil improver or an organic fertilizer (depending on the N, P and K content of the concentrate mixture and on the final moisture content obtained).

The soil improver may be supplemented with inorganic elements so as to obtain the desired composition in terms of inorganic content.

Thus, after the overall treatment of the process, the effluent is converted into a purified aqueous phase and into an agricultural product whose use is under complete control and which makes it possible to improve soils under cultivation with complete respect of the environment.

Depending on the volumes of effluent to be treated:
- steps (A) to (F) may be carried out at the source without the need for heavy collective transportation or by grouping together several effluent sources very close to the treatment plant;
- step (I) (aerobic fermentation) may be carried out on the same site or on a platform collecting concentrates from adjacent concentrators.

The process according to the invention can be used to purify the mixtures (or effluents) containing organic excreta, especially animal manure, in particular cattle, poultry, sheep or pig manure. It is, for example, advantageously employed for the treatment of pig manure directly on the site of the agricultural operation in question.

The process according to the invention can also be applied to the treatment of effluents coming from agri-foodstuffs industries.

The advantages of the process according to the invention are, in particular:
- the process according to the invention is a physical process which can be started immediately and, unlike biological processes, its operation can be stopped when it is desired;
- the process of the invention may be adapted to all volumes of the mixture to be treated (from about a hundred liters per day to several tens of $m^3$ per day);

it uses membrane techniques allowing complete purification and easy local management of the purified liquid;

it is not sensitive to the presence of bactericidal agents in the effluent, unlike other processes such as bioprocesses;

it is not sensitive to changes in the weather, unlike other processes such as bioprocesses;

the sequence of successive steps results in an optimized operation, allowing high membrane fluxes and long intervals between washing phases.

An example of how the process according to the invention is implemented using a plant of the type shown in FIGS. 2 and 3 will be given below.

EXAMPLE 1

Pig manure having the following characteristics is treated:

| | |
|---|---|
| COD | 21000 ppm |
| NTK (total nitrogen) | 1960 ppm |
| N NH$_4$ (nitrogen in the form of NH$_4$) | 1400 ppm |
| PO$_4$ | 2630 ppm |
| Solid content (105° C.) (by weight) | 1.88% |

Treatment of the liquid phase

Pork manure (introduced at a rate of 1230 kg/h) undergoes liquid/solid separation in step (A) using a rotary drum filter with an acceleration of 25 g, with continuous extraction of the concentrate, the drum filter being equipped with a 50 micrometer mesh screen. The concentrate (10 kg/h) has a solid content (105° C.) of 26%. The filtrate (1220 kg/h) obtained has the following characteristics:

| | |
|---|---|
| Solid content at 105° C. | 1.60% by weight |
| COD | 18000 ppm |
| NTK (total nitrogen) | 1710 ppm |
| N NH$_4$ | 1400 ppm |
| PO$_4$ | 2410 ppm |

The filtrate from step (A) is subjected to coagulation (step (B)) with stirring using a solution of coagulants which is introduced at a rate of 6 l/h.

The solution of coagulants comprises:

Poly(diallyldimethylammonium chloride) with 50% dry matter (10 vol %)

Alumina sulphate containing 8.2% Al$_2$O$_3$(37.5 vol %)

96% Sulphuric acid (10 vol %)

Water (q.s.p.).

The effluent thus coagulated is flocculated in step (C) by introducing, at a rate of 15 l/h, a solution of a flocculant of the acrylamide copolymer type and of sodium acrylate, in an amount of 1.2 g of active material per liter of water.

In step (D), the first liquid/solid separation using a flotation apparatus produces a filtrate (1064 kg/h) having the following characteristics:

| | |
|---|---|
| SC, 105° C. | 0.54% |
| COD | 1200 ppm |
| NTK | 1260 ppm |
| N NH$_4$ | 1160 ppm |
| Instantaneous turbidity | 20 NTU |
| PO$_4$ | 190 ppm |

The sludge, separated using the flotation apparatus (156 kg/h) has a solid content (105° C.) of 5.24%. After storing it in a drained area for 24 hours, the solids content reached 11.5%; the sludge is then mixed with a cationic polymer having a high molecular weight in an amount of 1 kg/t of sludge having a 10% solids content. After vacuum filtration, a concentrate having a solid content (105° C.) of 21.5% is obtained.

Next, the collection of filtrates from step (D) is subjected to ultrafiltration (step (E)) using organic membranes made of acrylonitrile copolymers having a cut-off threshold of 40 kD in order to give an ultrafiltrate having a solid content (105° C.) of 0.4% and an instantaneous turbidity of 15 NTU.

Next, the ultrafiltrate is treated by reverse osmosis with a concentration factor of approximately 10 (step (F)).

A concentrate (112 kg/h) is then obtained which has a solid content of 5.2% and a permeate (922 kg/h) having the following characteristics:

| | |
|---|---|
| COD | 400 ppm |
| NTK | 146 ppm |
| N NH$_4$ | 124 ppm |
| PO$_4$ | <10 ppm |
| Turbidity | <1 NTU. |

This permeate (the purified aqueous phase) may be used as water for technical purposes in the context of agricultural or stock-raising activities.

The collection of concentrates from steps (A), (D) and (F) having solid contents of 26, 21.5 and 5.2%, respectively, are combined to form a mass (160 kg/h) having a solid content of approximately 10.5%.

To these 160 kg of concentrate are added 60 kg of an organic supplement having a 70% solids content by weight consisting of chopped straw or bark.

A mixture (220 kg) having a solids content of approximately 27% by weight is formed.

By means of aerobic fermentation, an organic soil improver having a solids content of 45% by weight, containing almost all the nitrogen and phosphorous initially present in the raw manure, is obtained.

What is claimed is:

1. A process for a treatment of an aqueous liquid effluent containing organic and inorganic matter and having a solids content of at most 12% by weight of dry matter to obtain a purified liquid phase and a solid organic fertilizer, an organic soil improver, or a combination thereof, which process comprises:

subjecting the aqueous liquid effluent to one or more primary liquid/solid separation steps and, optionally, one or more physico-chemical treatment steps to obtain a liquid medium containing no more than 3% by weight of dry matter and having a turbidity of at most 300 NTU and a collection of concentrates containing in total at least 15% by weight of dry matter;

subjecting the liquid medium thus obtained to an ultrafiltration or microfiltration step to obtain an ultrafiltrate or microfiltrate containing at most 1% by weight of dry matter and having a turbidity of at most 100 NTU;

subjecting the ultrafiltrate or microfiltrate to a reverse osmosis operation to obtain a concentrate and a permeate, the permeate constituting the purified liquid phase;

adding and mixing with the collection of concentrates an organic complement in particulate form to obtain a mixture containing from 20 to 40% by weight of dry matter, and aerobically fermenting said mixture until an organic soil improver or an organic fertilizer having a dry matter content of 40 to 60% by weight, or a combination thereof is obtained.

2. The process according to claim 1, in which a retentate from the ultrafiltration or microfiltration step is recycled into the liquid/solid separation step or steps.

3. The process according to claim 1, wherein the aqueous liquid effluent contains manure.

4. The process according to claim 1, wherein the liquid medium obtained prior to ultrafiltration or microfiltration contains no more than 1% by weight of dry matter and has a turbidity of at most 200 NTU.

5. A process for treatment of an aqueous liquid effluent containing organic and inorganic matter and having a solid content of at most 12% by weight of dry matter to obtain a purified liquid phase and a solid organic fertilizer, an organic soil improver, or a combination thereof, which comprises, in succession, the following steps:

(A) subjecting the aqueous liquid effluent containing organic and inorganic matter to at least one primary liquid/solid separation step to obtain a first concentrate and a filtrate, which first concentrate contains a total of at least 15% by weight in dry matter, and the filtrate contains no more than 3% by weight of dry matter and has a turbidity of at most 300 NTU;

(B) treating the filtrate from step (A) using at least one coagulant;

(C) treating an effluent obtained from step (B) using at least one flocculant;

(D) subjecting an effluent from step (C) to at least one primary liquid/solid separation step to obtain a second concentrate and a filtrate;

(E) subjecting the filtrate obtained from step (D) to a membrane ultrafiltration or microfiltration operation to obtain a retentate and a filtrate;

(F) subjecting the filtrate from step (E) to a reverse osmosis operation to obtain a permeate, which constitutes the purified liquid phase, and a concentrate;

(G) mixing the first concentrate from step (A) with the second concentrate from step (D) and the concentrate from step (F);

(H) optionally adding an organic complement in particulate form to the mixture from step (G) to obtain a mixture containing from 20 to 40% by weight of dry matter; and (I) aerobically fermenting the mixture from step (G) or (H) until an organic soil improver or an organic fertilizer having a dry matter content of 40 to 60% by weight, or a mixture thereof is obtained.

6. The process according to claim 5, in which step (B) is carried out, optionally in the presence of at least one acid, using at least one inorganic coagulant and at least one organic coagulant.

7. The process according to claim 5, in which step (B) is carried out using a mixture formed from at least one inorganic coagulant, at least one organic coagulant and at least one acid.

8. The process according to claim 6, in which the said organic coagulant is a cationic polyelectrolyte.

9. The process according to claim 5, in which the retentate obtained from the ultrafiltration or microfiltration is recycled into step (B).

10. The process according to claim 5, in which step (D) comprises a first liquid/solid separation step providing a medium-solids-content concentrate containing at least 4% by weight of dry matter and a second liquid/solid separation step which treats the concentrate to obtain a second concentrate containing at least 15% by weight of dry matter.

11. The process according to claim 10, which comprises conditioning the concentrate obtained from the first liquid/solid separation step before its treatment in the second liquid/solid separation step.

12. The process according to claim 11, in which said conditioning is a chemical conditioning.

13. The process according to claim 12, wherein said chemical conditioning is conducted by means of at least one inorganic coagulant.

14. The process according to claim 5, wherein the flocculant comprises at least one anion polyelectrolyte.

15. A process for a treatment of an aqueous liquid effluent containing organic and inorganic matter to obtain an ultrafiltrate or microfiltrate, which process comprises:

subjecting the effluent to one or more primary liquid/solid separation steps to obtain a liquid medium containing no more tan 3% by weight of dry matter and having a turbidity of at most 300 NTU; and subjecting the liquid medium thus obtained to an ultrafiltration or microfiltration step to obtain an ultrafiltrate or a microfiltrate.

16. The process according to claim 15, wherein the ultrafiltrate or microfiltrate contains at most 1% by weight of dry matter and has a turbidity of at most 100 NTU.

17. The process according to claim 15, further comprising subjecting the ultrafiltrate or microfiltrate to a reverse osmosis operation.

18. The process according to claim 15, wherein the aqueous liquid effluent contains manure.

19. The process according to claim 15, wherein the liquid medium obtained prior to ultrafiltration or microfiltration contains no more than 1% by weight of dry matter and has a turbidity of at most 200 NTU.

20. The process according to claim 15, further comprising mixing one or more concentrates obtained after the primary liquid/solid separation step, the ultrafiltration or microfiltration step, or a combination thereof, with an organic complement in particulate form to obtain a mixture containing from 20 to 40% by weight of dry matter, and aerobically fermenting said mixture until an organic soil improver or an organic fertilizer having a dry matter content of 40 to 60% by weight, or a combination thereof is obtained.

* * * * *